US006195436B1

(12) United States Patent
Scibora et al.

(10) Patent No.: US 6,195,436 B1
(45) Date of Patent: Feb. 27, 2001

(54) MULTI-STATION AUDIO DISTRIBUTION APPARATUS

(75) Inventors: Marco Scibora, St. Paul; Warren Kahle, Woodbury, both of MN (US)

(73) Assignee: Advanced Communication Design, Inc., Bloomington, MN (US)

( * ) Notice: Subject to any disclaimer, the term of this patent is extended or adjusted under 35 U.S.C. 154(b) by 0 days.

(21) Appl. No.: 09/007,530

(22) Filed: Jan. 15, 1998

Related U.S. Application Data

(63) Continuation of application No. 08/760,640, filed on Dec. 4, 1996.

(51) Int. Cl.[7] ........................................ H04B 3/00
(52) U.S. Cl. ........................................ 381/77
(58) Field of Search .................................... 381/77, 81, 2, 381/85; 700/94; 369/30

(56) References Cited

U.S. PATENT DOCUMENTS

| | | | | |
|---|---|---|---|---|
| 4,279,185 | | 7/1981 | Alonso . | |
| 4,924,303 | | 5/1990 | Brandon et al. . | |
| 5,481,478 | | 1/1996 | Palmieri et al. . | |
| 5,515,347 | | 5/1996 | Mulder et al. . | |
| 5,546,324 | | 8/1996 | Palmer et al. . | |
| 5,548,281 | | 8/1996 | Funahashi et al. . | |
| 5,555,098 | | 9/1996 | Parulski . | |
| 5,596,647 | | 1/1997 | Wakai et al. . | |
| 5,625,404 | | 4/1997 | Grady et al. . | |
| 5,629,867 | | 5/1997 | Goldman . | |
| 5,631,745 | | 5/1997 | Wong et al. . | |
| 5,633,839 | * | 5/1997 | Alexander et al. | 369/30 |
| 5,668,788 | * | 9/1997 | Allison | 369/30 |
| 5,689,481 | * | 11/1997 | Tamura et al. | 369/30 |
| 5,691,964 | * | 11/1997 | Niederlein et al. | 369/30 |
| 5,784,558 | * | 7/1998 | Emerson et al. | 379/12 |

OTHER PUBLICATIONS

Newton, Harry. "Newton's Telecom Dictionary", Flatiron Publishing, Inc., p. 820, lines 8–13, Nov. 1994.*

* cited by examiner

*Primary Examiner*—Vivian Chang
(74) *Attorney, Agent, or Firm*—Gerald E. Helget; Rider, Bennett, Egan & Arundel

(57) ABSTRACT

A multi-station audio distribution apparatus having at least two listening stations, a data control mechanism and a listening station interface mechanism disposed between the listening stations and the data control mechanism. Each of the listening stations has a user input in the form of a bar code scanner to enter an audio material selection and each has an audio output. The data control mechanism retrieves digitized audio material corresponding to each of the user's audio material selections. The listening station interface mechanism transfers the user's inputs from each of the listening stations to the data control mechanism, receives the digitized audio materials corresponding to each user's input from the data control mechanism, converts the digital audio materials to analog audio signals and transfers the analog audio signals to each of the respective listening stations for the audio output.

26 Claims, 1 Drawing Sheet

MULTI-STATION AUDIO DISTRIBUTION APPARATUS

This application is a continuation of co-pending U.S. Patent application No. 08/760,640, filed Dec. 4, 1996, which is hereby incorporated by reference. This application is being filed under 37 C.F.R. §1.53(b).

BACKGROUND OF THE INVENTION

This invention relates to a sound sampling device and more particularly to a multi-station audio distribution apparatus for sampling audio material.

Few retail music stores allow test sampling of the compact discs and/or cassettes that they sell. Thus, a music consumer is left to rely on the radio stations to first hear what may be contained on a compact disc. Radio stations, however, generally play only one selection from a compact disc that may contain ten or more musical selections. The result is that a musical consumer buys a compact disc based on the one selection they've heard only to be disappointed by the additional selections which are not equivalent in quality or are not to the liking of the consumer. After repeated occurrences of the afore described situation, the disappointed consumer will inevitably meet a level of frustration at which point they will buy only a compact disc containing a single selection, at a much lower cost than the album compact disc, or will stop buying compact discs altogether. In either situation, the profits of the retail music store are reduced.

Those retail music stores that do allow test sampling, do so by actually opening a compact disc or cassette and inserting the cassette or disk into the player for the consumer to hear. Generally, the store is limited to one or two players and the retail store will only open those discs which it believes will be popular and will sell. The limitations are thus apparent, a retail music store may be full of customers yet only one or two may listen to a musical sample. Further, those consumers that are interested in non-mainstream music are left in the cold with no opportunity to sample their preferred music.

Based on the foregoing, there is a need for an apparatus that will allow a number of consumers to simultaneously listen to different discs of all types of music and will allow the user to hear more than a sample of one selection contained on the compact disc.

SUMMARY OF THE INVENTION

A multi-station audio distribution apparatus having at least two listening stations, a data control mechanism and a listening station interface mechanism disposed between the listening stations and the data control mechanism. Each of the listening stations has a user input in the form of a bar code scanner to enter an audio material selection and each has an audio output. The data control mechanism retrieves digitized audio material corresponding to each of the user's audio material selections. The listening station interface mechanism transfers the user's input from each of the listening stations to the data control mechanism, receives the digitized audio materials corresponding to each user's input from the data control mechanism, converts the digital audio materials to analog audio signals and transfers the analog audio signals to each of the respective listening stations for the audio output.

An object and advantage of the present invention is that the multi-station audio distribution apparatus may utilize multiple listening stations that are controlled by a single data control means.

Another object and advantage of the present invention is that bar code scanning may be used to select the desired audio material.

Another object and advantage of the present invention is that random access to audio material is provided at any and all of the listening stations.

Yet another object and advantage of the present invention is that data related to the selected audio material may be displayed at each listening station. As well, apparatus adjustments such as forwarding/reversing to a different track of the audio material, fast forwarding/reversing through a selected audio track and volume control may also be provided at each listening station.

Still another object and advantage of the present invention is that low voltage wiring is used to connect each listening station to the listening station interface means.

Another object and advantage of the present invention is that the multi-station audio distribution apparatus performs playback of audio material stored in multiple digital formats.

Another object and advantage of the present invention is that the multi-station audio distribution apparatus provides scalable architecture that can grow from a small to a massive apparatus.

DETAILED SPECIFICATION

The multi-station audio distribution apparatus 10 generally comprises three component parts, a listening station 20, a listening station interface means 40 and a data control means 60.

Figure 1:
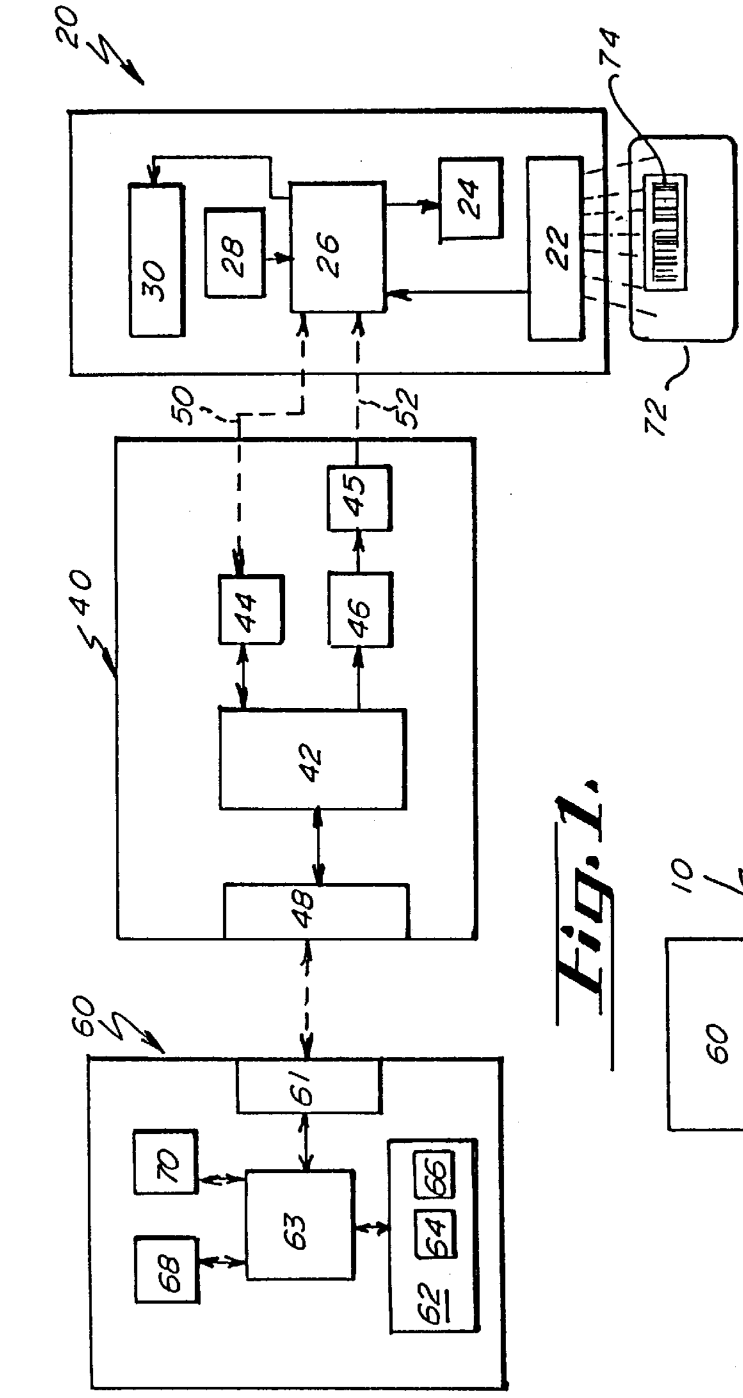
FIG. 1 depicts components of one listening station, one listening station interface means and the data control means of the present invention.

The layout of the listening station 20 is shown in FIG. 1. The listening station 20 at a basic level incorporates a user input in the form of a bar code scanner 22, an audio output 24, which may be a speaker and/or a standard stereo phono jack attached to headphones, and a software controlled microcontroller 26. The bar code scanner 22 and audio output 24 are tied to the microcontroller 26 which handles the transfer of all inputs into the listening station 20 and all outputs out of the listening station 20. The listening station 20 may further incorporate a keypad 28 and a visual display 30 such as a liquid crystal display. The keypad 28 can be used to input apparatus adjustments such as volume control, audio track selection and speed of playback. Further, the keypad 28 may be enabled for other input functions such as "help", "price", "additional information", "similar music", and "interview with artist or author". The visual display 30 can be used to display informational data relating to selected audio material such as the title of a track, name of the artist or author, price, label, genre, media, etc. As with the bar code scanner 22 and audio output 24, the keypad 28 and visual display 30 are tied to the software controlled microcontroller 26 to handle inputs to and outputs from the listening station 20.

The listening station interface means 40 is also shown in FIG. 1. Depending on hardware configuration the listening station interface means 40 may be adapted to accommodate one or two listening stations 20. Each listening station interface means 40 is generally in the form of a circuit board powered by low voltage direct current. Contained within the circuit board is a microcontroller 42 under program control having random access memory and read only memory, a digital interface 44, an analog interface 45, a digital to analog converter 46 and a data control means interface 48. The digital interface 44 is tied to the microcontroller 42 and is connected to the listening station 20 via a low voltage digital interface cable 50. The digital to analog converter 46 is also tied to the microcontroller 42 and is connected to the listening station 20 through the analog interface 45 via a low voltage analog interface cable 52. The microcontroller 42 is connected to the data control means 60 via the data control means interface 48. The microcontroller 42 serves as the data and audio signal transfer mechanism between the data control means 60 and the listening station 20.

The data control means 60, see FIG. 1, comprises a standard computer platform that incorporates a power supply, a backplane/bus 61 that is connectable to the data control means interface 48 of the listening station interface means 40, a microprocessor 63, random access memory, and interfaces to various peripherals such as disk drives that operate in conjunction with disk controllers, modems, video displays, keyboards, and tape backup units. The data control means 60, or computer platform, utilizes operating system software 62 (e.g. UNIX) that has low level device drivers 64, file management utilities 66 and further utilizes application software 68 that operates within the computer platform to implement the full functionality of the apparatus 10. The computer platform also incorporates high-speed random access storage of audio material in digital form; the audio material is contained in data files stored on internal or external hard drives 70 that are connected to interfaces within the computer platform. The data control means 60 is connected to the listening station interface means 40 via the data control means interface 48 which is a computer bus.

Figure 2:
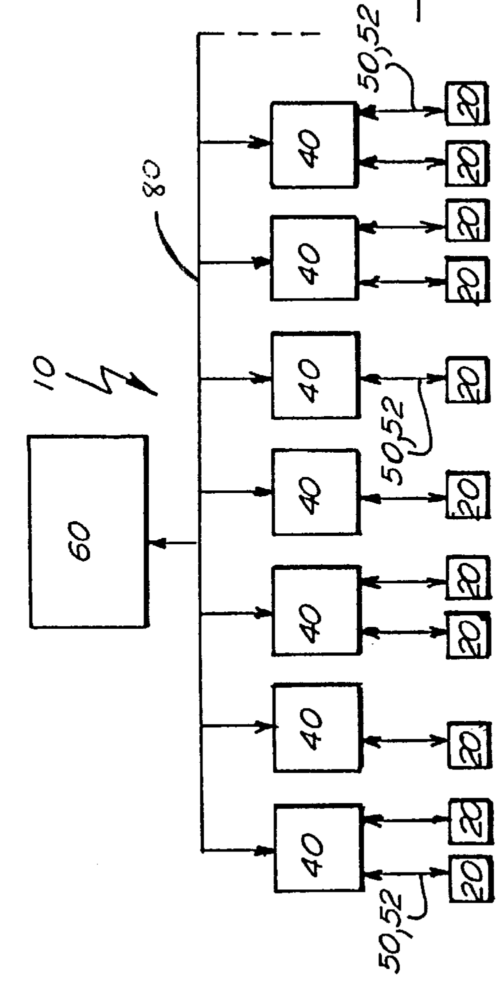
FIG. 2 depicts the layout of the present invention with its single data control means and multiple listening stations and listening station interface means.

The layout of the multi-station audio distribution apparatus 10 is shown in FIG. 2, its operation as applied to a retail music store is preferably described as follows. A user selects a music CD (compact disc) 72 from among those offered for sale. The user takes the CD 72 to a nearby listening station 20 puts on the attached headphones and passes the bar code 74 that is imprinted on the CD label under the bar code scanner 22.

The bar code scanner 22 transmits the bar code 74 through a serial data connection to the software controlled microcontroller 26 contained within the listening station 20. This data is received by the microcontroller 26 and temporarily stored in RAM under program control. The program packetizes the data and retransmits it to the listening station interface means 40 through the digital interface cable 50, which is a 6-conductor modular cable. The data packet is received, after passing through the digital interface 44, as a serial bit stream by the listening station interface means' microcontroller 42 and temporarily stored in RAM under the microcontroller's (42) program control.

The microcontroller (42) program waits for a request from a device driver 64 within the data control means 60 before sending the bar code data back through the data control means bus interface 48 to the data control means 60. The device driver 64 polls each listening station interface means 40 approximately every 500 microseconds to exchange data, using an I/O (input/output) address within the data control means 60. The device driver 64 passes the bar code data to the application software 68 running on the data control means 60. The application software 68 then performs a database search against an index of all such bar codes contained within the data control means 60. This database and its index are created before the application software 68 is executed.

Assuming a match is found in the index, the corresponding database record is retrieved from a master file on the hard drive 70. This record contains informational data items relating to the CD 72 selected by the customer, such as artist, title, label, genre, media, bar code, price and filename. These informational data items are transmitted back to the listening station 20 through the chain described above (i.e. from the data control means 60 to the listening station interface means 40 via the data control means interface 48, then to the listening station 20 via the digital interface 44 and the digital interface cable 50). The informational data items can be displayed on the visual display for review by the user.

The filename retrieved from the database record is then used by the data control means 60 to access the audio material stored in digital form as a file on the hard drive 70. This function is performed by the operating system software 62 under the direction of the application software 68. Blocks of data are read from the hard drive 70, passed through a disk controller and temporarily buffered in RAM (random access memory). The application software 68 processes a "header" portion of the file which consists of approximately one kilobyte of data; the bytes of data include duplicates of fields contained in the master database as well as the compression method used to encode the audio material. The application software 68 then strips the header from the file and instructs the device driver 64 to send the remainder of the file to the listening station interface means 40, one "word" (i.e. 16 bits) at a time. This file of audio material can be mono or stereo and can be encoded as linear, uLaw, ADPCM or other algorithms at various digitization rates.

The microcontroller 42 within the listening station interface means 40 stores each word of the audio material in a FIFO (first in, first out) buffer, reporting the buffer status (full, half-empty, empty) back to the device driver 64 as needed to retrieve further audio material. The program directing operation of the microcontroller 42 empties the buffer by sending bytes of the audio material to the Digital-to-Analog converter 46, which translates the encoded bytes into an analog stereo signal. This analog stereo signal is amplified within the listening station interface means 40 before being sent to the listening station 20 through the analog interface 45 and the analog interface cable 52, which is a 8-conductor modular cable that is separate and distinct from the digital interface cable 50 described previously. The amplitude of the analog stereo signal is controlled by the listening station interface means' circuitry. The analog stereo signal received by the listening station 20 is passed directly to the audio output 24 which may be a speaker or a phono jack attached to headphones. The user hears the analog stereo signal from the selected CD 72 approximately a second or two after scanning the bar code 74.

A sample of three or more tracks from the CD 72 are typically stored on hard drive(s) in digital form. The visual display 30 may show the track number that is currently playing, as determined by the application software 68. The user may push a button on the keypad 28 at the listening station 20 to hear the next track or a previous track from the same CD 72. In addition, the user may press a "volume up" or "volume down" button on the keypad 28 to adjust the volume of the analog stereo signal. These keypad 28 depressions are read by the software controlled microcontroller 26 within the listening station 20 and are passed to the listening station interface means 40, to the device driver 64 and to the application software 68 for interpretation, action and responsive outputs consistent with apparatus adjustment keypad inputs. Other keypad buttons can be enabled for functions such as "help", "price", "additional information", "similar music", "interview with artist."

The customer merely has to scan another CD 72 to start the process over again. With the potential for many listening stations 20 in a single store location, the apparatus 10 depends on very high-speed processors and data storage.

As can be seen in FIG. 2, the apparatus 10 includes a dedicated, non-switched network 80 connecting the data control means 60 to each of the listening station interface means 40. Preferably, the listening stations, data control means, and listening station interface means reside within a single premises, such as a retail music store, bookstore, or library as described above.

While the above describes a retail music store application, the same might be applied to a book store or even a library to sample books on CD or tape.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A dedicated, non-switched, multi-station audio distribution apparatus that allows a plurality of users to simultaneously sample different audio tracks comprising:

(a) at least two listening stations, said at least two listening stations each consisting essentially of a user input, a visual display to display informational data corresponding to said user input, an audio output such that an analog audio signal corresponding to said user input may be heard, a keypad to enter apparatus adjustments, and a first microcontroller connected to said user input, said visual display, said audio output, and said keypad;

(b) a data control device adapted to retrieve informational data corresponding to each of said user inputs, to retrieve digitized audio material corresponding to each of said user inputs, and to produce responsive outputs consistent with each of said apparatus adjustments;

(c) at least one low voltage listening station interface device, disposed between said data control device and said at least two listening stations, further consisting essentially of a second microcontroller, a digital interface, an analog interface, a digital to analog converter, and a data control device interface, said digital interface, digital to analog converter, and data control device interface being connected to said second microcontroller, and an analog stereo amplifier within said low voltage listening station interface device, connected to said digital to analog converter and to said analog interface;

(d) low-voltage cabling connecting said listening station interface device to each of said at least two listening stations; and (e) a dedicated, non-switched connection connecting said data control device to said listening station interface device.

2. The multi-station audio distribution apparatus of claim 1, wherein said at least two listening stations, said data control device, and said listening station interface device reside within a single premises.

3. The multi-station audio distribution apparatus of claim 1, wherein said audio output is a speaker.

4. The multi-station audio distribution apparatus of claim 1, wherein said audio output is a stereo phone jack attached to headphones.

5. The multi-station audio distribution apparatus of claim 1, wherein said visual display comprises a liquid crystal display.

6. The multi-station audio distribution apparatus of claim 1, wherein said apparatus adjustments further comprise volume control, audio track selection, and playback speed.

7. The multi-station audio distribution apparatus of claim 1, wherein said keypad includes input functions selected from the set consisting of help, price, additional information, similar music, and interview with artist.

8. The multi-station audio distribution apparatus of claim 1, wherein said informational data further comprises track title, artist name, price, label, genre, and media.

9. The multi-station audio distribution apparatus of claim 1, wherein the data control device further comprises a standard computer platform having a power supply, a backplane/bus connected to the data control device interface, a microprocessor, a random access memory, and peripheral interfaces.

10. The multi-station audio distribution apparatus of claim 9, wherein the listening station interface device is a standard computer card that is connected to the backplane/bus.

11. The multi-station audio distribution apparatus of claim 9, further comprising at least one hard disk drive containing digitized audio material.

12. The multi-station audio distribution apparatus of claim 9, further comprising operating system software, file management utility software, application software, and a device driver connected to the listening station interface device through the backplane/bus.

13. The multi-station audio distribution apparatus of claim 12, wherein the device driver polls station interface device periodically to exchange data with the listening station interface device.

14. A dedicated, non-switched, multi-station audio distribution apparatus that allows a plurality of users to simultaneously sample different audio tracks comprising:

(a) at least two listening stations, said at least two listening stations each consisting essentially of a bar code scanner to produce a bar code reading, a visual display to display informational data corresponding to said bar code reading, an audio output such that an analog audio signal corresponding to said bar code reading may be heard, a keypad to enter apparatus adjustments, and a first microcontroller connected to said bar code scanner, said visual display, said audio output, and said keypad;

(b) the data control device adapted to retrieve informational data corresponding to each of said bar code readings, to retrieve digitized audio material corresponding to each of said bar code readings, and to produce responsive outputs consistent with each of said apparatus adjustments;

(c) at least one low voltage listening station interface device, disposed between said data control device and said at least two listening stations, further consisting essentially of a second microcontroller, a digital interface, an analog interface, a digital to analog converter, and a data control device interface, said digital interface, digital to analog converter, and data control device interface being connected to said second microcontroller, and an analog stereo amplifier within said low voltage listening station interface device, connected to said digital to analog converter and to said analog interface;

(d) a low-voltage analog interface cable connecting said analog interface to said at least two listening stations and adapted to pass an analog stereo signal from said analog interface to said audio output;

(e) a low-voltage digital interface cable connecting said digital interface to said first micro controller; and (f) a dedicated, non-switched connection connecting said data control device to said listening station interface device.

15. The multi-station audio distribution apparatus of claim 14, wherein said at least two listening stations, said data control device, and said listening station interface device reside within a single premises.

16. The single-premises, multi-station audio distribution apparatus of claim 14, wherein said audio output is a speaker.

17. The single-premises, multi-station audio distribution apparatus of claim 14, wherein said audio output is a stereo phone jack attached to headphones.

18. The single-premises, multi-station audio distribution apparatus of claim 14, wherein said visual display comprises a liquid crystal display.

19. The single-premises, multi-station audio distribution apparatus of claim 14, wherein said apparatus adjustments further comprise volume control, audio track selection, and playback speed.

20. The single-premises, multi-station audio distribution apparatus of claim 14, wherein said keypad includes input functions selected from the set consisting of help, price, additional information, similar music, and interview with artist.

21. The single-premises, multi-station audio distribution apparatus of claim 14, wherein said informational data further comprises track title, artist name, price, label, genre, and media.

22. The single-premises, multi-station audio distribution apparatus of claim 14, wherein the data control device further comprises a standard computer platform having a power supply, a backplane/bus connected to the data control device interface, a microprocessor, a random access memory, and peripheral interfaces.

23. The single-premises, multi-station audio distribution apparatus of claim 22, wherein the listening station interface device is a standard computer card that is connected to the backplane/bus.

24. The single-premises, multi-station audio distribution apparatus of claim 22, further comprising at least one hard disk drive containing digitized audio material.

25. The single-premises, multi-station audio distribution apparatus of claim 22, further comprising operating system software, file management utility software, application software, and a device driver connected to the listening station interface device through the backplane/bus.

26. The single-premises, multi-station audio distribution apparatus of claim 25, wherein the device driver polls the listening station interface device periodically to exchange data with the listening station interface device.

* * * * *

UNITED STATES PATENT AND TRADEMARK OFFICE

CERTIFICATE OF CORRECTION

PATENT NO. : 6,195,436 B1
DATED : February 27, 2001
INVENTOR(S) : Marco Scibora

It is certified that error appears in the above-identified patent and that said Letters Patent is hereby corrected as shown below:

Column 6,
Line 30, please insert -- the listening -- after the word "polls".

Signed and Sealed this

Fifteenth Day of October, 2002

*Attest:*

JAMES E. ROGAN
*Director of the United States Patent and Trademark Office*

*Attesting Officer*